(12) United States Patent
Chandler et al.

(10) Patent No.: US 10,808,585 B2
(45) Date of Patent: Oct. 20, 2020

(54) CATALYTIC WALL-FLOW FILTER WITH PARTIAL SURFACE COATING

(71) Applicant: Johnson Matthey Public Limited Company, London (GB)

(72) Inventors: Guy Richard Chandler, Royston (GB); Keith Anthony Flanagan, Royston (GB); Paul Richard Phillips, Royston (GB); David Marvell, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/794,043

(22) Filed: Oct. 26, 2017

(65) Prior Publication Data
US 2018/0119589 A1    May 3, 2018

Related U.S. Application Data

(60) Provisional application No. 62/414,301, filed on Oct. 28, 2016.

(51) Int. Cl.
*F01N 3/02* (2006.01)
*F01N 3/20* (2006.01)
(Continued)

(52) U.S. Cl.
CPC .......... *F01N 3/035* (2013.01); *B01D 53/944* (2013.01); *B01D 53/9472* (2013.01);
(Continued)

(58) Field of Classification Search
CPC .. B01D 53/86; B01D 53/944; B01D 53/9463; B01D 53/9468; B01D 53/9472;
(Continued)

(56) References Cited

U.S. PATENT DOCUMENTS 6,753,294 B1    6/2004 Brisley et al.
8,398,925 B2    3/2013 Chiffey et al.
(Continued)

FOREIGN PATENT DOCUMENTS

DE    102005005663 A1    8/2006
DE    102008055890 A1    5/2010
(Continued)

*Primary Examiner* — Thai Ba Trieu
*Assistant Examiner* — Dapinder Sinh

(57) ABSTRACT

A catalytic wall-flow monolith filter for use in an emission treatment system comprises a wall flow substrate having a first and a second face, and first and second pluralities of channels. The first plurality of channels is open at the first face and closed at the second face. The second plurality of channels is open at the second face and closed at the first face. The monolith filter comprises a porous substrate having a first zone extending from the first face towards the second face and a second zone extending from the second face towards the first face. Each of the zones are less that filter length. A first catalytic material is distributed throughout the first zone of the porous substrate, and a second catalytic material covers at least a portion of the surfaces in the second zone of the porous substrate and is not distributed throughout the porous substrate.

19 Claims, 4 Drawing Sheets

A-A line cross-sectional view

(51) Int. Cl.
*B01D 53/94* (2006.01)
*F01N 3/035* (2006.01)
*B01J 23/56* (2006.01)
*B01J 37/02* (2006.01)

(52) U.S. Cl.
CPC ........ *F01N 3/2066* (2013.01); *B01D 53/9418* (2013.01); *B01D 2255/2065* (2013.01); *B01D 2255/20776* (2013.01); *B01D 2255/50* (2013.01); *B01D 2255/9155* (2013.01); *B01J 23/56* (2013.01); *B01J 37/0246* (2013.01); *F01N 2330/02* (2013.01); *F01N 2330/06* (2013.01); *F01N 2330/60* (2013.01); *F01N 2370/04* (2013.01); *Y02T 10/24* (2013.01)

(58) Field of Classification Search
CPC ........ B01D 53/9418; B01D 2255/2065; B01D 2255/2076; B01D 2255/50; B01D 2255/9155; B01J 23/56; B01J 37/0246; F01N 3/035; F01N 3/2066; F01N 2330/02; F01N 2330/06; F01N 2330/60; F01N 2370/04; Y02T 10/24
USPC .... 60/274, 295, 297, 299–301, 311; 95/273, 95/274, 279, 282, 285, 286; 96/154; 55/524
See application file for complete search history.

(56) References Cited

U.S. PATENT DOCUMENTS

| | | | |
|---|---|---|---|
| 8,617,476 B2 | 12/2013 | Ogyu et al. | |
| 9,669,359 B2 * | 6/2017 | Szczepanski | F01N 3/2828 |
| 9,993,771 B2 * | 6/2018 | Voss | B01D 53/9418 |
| 10,159,934 B2 * | 12/2018 | Kitamura | B01D 53/94 |
| 2004/0254073 A1 | 12/2004 | Wei et al. | |
| 2011/0014099 A1 | 1/2011 | Dornhaus et al. | |
| 2011/0078997 A1 | 4/2011 | Boorse et al. | |
| 2011/0094207 A1 | 4/2011 | Woerz et al. | |
| 2011/0229391 A1 | 9/2011 | Paulus et al. | |
| 2012/0247092 A1 | 10/2012 | Boorse | |
| 2014/0140899 A1 | 5/2014 | Gabrielsson et al. | |
| 2015/0152768 A1 * | 6/2015 | Arulraj | F01N 3/2828 428/117 |
| 2017/0304773 A1 | 10/2017 | Onoe et al. | |
| 2018/0111089 A1 * | 4/2018 | Li | B01D 53/9418 |

FOREIGN PATENT DOCUMENTS

| | | |
|---|---|---|
| DE | 102014117672 A1 | 6/2015 |
| EP | 2275194 B1 | 1/2011 |
| EP | 2322773 A1 | 5/2011 |
| WO | 9947260 | 9/1999 |
| WO | WO-2005016497 A1 | 2/2005 |
| WO | 2005030365 | 4/2005 |
| WO | 2008106519 | 9/2008 |
| WO | 2009001131 | 12/2008 |
| WO | 2010043891 | 4/2010 |
| WO | 2011064666 | 6/2011 |
| WO | 2011080525 | 7/2011 |
| WO | 2014195685 | 12/2014 |
| WO | WO-2016060049 A1 | 4/2016 |

* cited by examiner

A-A line cross-sectional view

A-A line cross-sectional view

CATALYTIC WALL-FLOW FILTER WITH PARTIAL SURFACE COATING

FIELD OF THE INVENTION

The present invention relates to a catalytic wall-flow monolith suitable for use in an emission treatment system, such as in mobile and stationary systems having internal combustion exhaust system. The monolith provides an effective method of remediating engine exhaust streams.

BACKGROUND OF THE INVENTION

Emissions from internal combustion engines, including diesel engines, are regulated by legislation put in place by governments worldwide. The amount of a single material, such as carbon monoxide (CO), or a mixture of related materials, such as particulate matter (PM) or NOx, present in gas leaving the exhaust system of an engine is limited by legislated requirements from various governments. Manufacturers are seeking to meet these legislated requirements through a combination of engine design and exhaust gas after-treatment. The exhaust systems used to carry out exhaust gas after-treatment commonly comprise a series of catalysts and/or filters that are designed to carry out certain reactions that reduce the amount of exhaust gas species limited by such legislation.

A diesel engine exhaust stream is a heterogeneous mixture which contains not only gaseous emissions, such as carbon monoxide ("CO"), unburned hydrocarbons ("HC") and nitrogen oxides ("$NO_x$"), but also condensed phase materials (liquids and solids) which constitute the so-called particulates or particulate matter. Often, catalyst compositions and substrates on which the compositions are disposed are provided in diesel engine exhaust systems to convert certain or all of these exhaust components to innocuous components, such as water and nitrogen. For example, diesel exhaust systems can contain one or more of a diesel oxidation catalyst, a soot filter and a catalyst for the reduction of $NO_x$.

The total particulate matter emissions of diesel exhaust streams include a solid, dry, carbonaceous fraction, a so-called soot fraction. This dry carbonaceous matter contributes to the visible soot emissions commonly associated with diesel exhausts.

One key after-treatment technology in use for high particulate matter reduction is the diesel particulate filter. There are several known filter structures that are effective in removing particulate matter from diesel exhaust streams, such as honeycomb wall-flow filters, wound or packed fiber filters, open cell foams, sintered metal filters, etc. However, ceramic wall flow filters, described below, are the most popular type. These filters are capable of removing over 90% of the particulate material from diesel exhaust streams. The filter is a physical structure for removing particles from exhaust streams. Accumulation of particles on the filter will increase the back pressure from the filter on the engine. Thus the accumulating particles have to be continuously, or periodically burned out of the filter to maintain an acceptable back pressure. Unfortunately, the carbon soot particles can sometimes require temperatures in excess of 500° C. to burn under oxygen rich (lean) exhaust conditions. This temperature is higher than those typically present (200-400° C.) in diesel exhaust streams.

The two main methods for regenerating a filter by removing soot from the filter use passive or active passive regeneration. Passive regeneration burns the soot from the filter by increasing the concentration of $NO_2$ over the catalyst on the filter. Active regeneration remotes soot from a soot filter by raising the temperature of soot trapped in the filter to about 500-550° C. to burn the soot and regenerate the filter. One way to increase the filter temperature is to intermittently introduce additional hydrocarbon fuel into the exhaust gas before the soot filter and combust this additional hydrocarbon to increase the filter temperature. Combustion of the additional hydrocarbon fuel can be effected on the filter itself by coating the filter with a suitable combustion-promoting catalyst. A suitably catalysed filter is often referred to as a catalysed soot filter or CSF.

During active regeneration the CSF may need to reach temperatures of approximately 500-550° C. to permit particulate matter to be removed (combusted) at a sufficient rate. However, if during an active regeneration event, a period of low exhaust gas flow occurs, e.g. when the engine/vehicle is caused to idle, the reduced gas flow prevents heat from being removed from the CSF. This can result in parts of the filter reaching temperatures in excess of 1000° C. Such high temperatures can cause two major problems. Firstly, the catalyst can sinter, reducing its surface area and as a consequence catalyst activity is lost. Secondly, high thermal gradients can occur in the substrate leading to mechanical stress caused by differences in thermal expansion. Under extreme conditions the thermal gradients and stresses can cause substrates to crack, thereby resulting in a failure of the integrity of the CSF.

Therefore, the challenge is in controlling the active regeneration of the CSF so that it can reach temperatures sufficiently high to remove particulate matter but not so high as to cause damage to the catalyst and/or the filter substrate.

As noted above, diesel exhaust streams also contain $NO_x$. A proven NOx abatement technology useful with lean exhaust conditions is Selective Catalytic Reduction (SCR). In this process, $NO_x$ is reduced with ammonia ($NH_3$) to nitrogen ($N_2$) over a catalyst typically composed of base metals. This technology is capable of $NO_x$ reduction greater than 90%, and thus it represents one of the best approaches for achieving aggressive $NO_x$ reduction goals. SCR provides efficient conversions of $NO_x$ as long as the exhaust temperature is within the active temperature range of the catalyst.

Separate substrates, each containing catalysts to address discrete components of the exhaust can be provided in an exhaust system. However, use of fewer substrates is desirable to reduce the overall size of the system, to ease the assembly of the system, and to reduce the overall cost of the system. One approach to achieve this goal is to coat the soot filter with a catalyst composition effective for the conversion of $NO_x$ to innocuous components. With this approach, the catalysed soot filter assumes two catalyst functions: removal of the particulate component of the exhaust stream and conversion of the $NO_x$ component of the exhaust stream to nitrogen.

Coated soot filters that can achieve $NO_x$ reduction goals require a sufficient loading of an SCR catalyst on the soot filter to have enough active sites to allow for the desired rates of NOx reduction. The gradual loss of the catalytic effectiveness of the compositions that occurs over time through exposure to certain deleterious components of the exhaust stream augments the need for higher catalyst loadings of the SCR catalyst composition. However, preparation of coated soot filters with higher catalyst loadings can lead to unacceptably high back pressure within the exhaust system. Coating techniques that allow higher catalyst loadings on the wall flow filter, yet still allow the filter to maintain flow characteristics that achieve acceptable back pressures, are therefore desirable.

An additional aspect for consideration in coating the wall-flow filter is the selection of the appropriate SCR catalyst composition. First, the catalyst composition must be durable so that it maintains its SCR catalytic activity even after prolonged exposure to higher temperatures that are characteristic of filter regeneration. For example, combustion of the soot fraction of the particulate matter often leads to overall filter temperatures in the range of 500-600° C., with localized temperatures above 700° C. Such temperatures render many commonly used SCR catalyst compositions such as mixed oxides of vanadium and titanium less catalytically effective. Second, the SCR catalyst compositions preferably have a wide enough operating temperature range so that they can accommodate the variable temperature ranges over which the vehicle operates. Temperatures below 300° C. are typically encountered, for example, at conditions of low load, or at startup. The SCR catalyst compositions are preferably capable of catalyzing the reduction of the $NO_x$ component of the exhaust to achieve $NO_x$ reduction goals, even at lower exhaust temperatures.

U.S. Pat. No. 8,617,476 discloses a honeycomb filter characterised by the amount of zeolite supported on the channel walls and the thermal conductivity of the walls.

U.S. Pat. No. 8,398,925 discloses a particulate filer substrate for an internal combustion engine. The filter substrate is coated with a washcoat having regions of different densities.

WO2005016497 discloses an exhaust treatment system for simultaneously remediating nitrogen oxides (NOx), particulate matter, and gaseous hydrocarbons present in diesel engine exhaust streams. The emission treatment system has an oxidation catalyst upstream of a soot filter coated with a material effective in the Selective Catalytic Reduction (SCR) of NOx by a reductant, e.g., ammonia. A method for disposing an SCR catalyst composition on a wall flow monolith that provides adequate catalyst loading, but does not result in unsuitable back pressures in the exhaust, is also described.

US2012/0247092 discloses a multi-component filter for emission control. A catalytic article comprising a wall flow filter having gas permeable walls, a hydrolysis catalyst, an optional soot oxidation catalyst, a selective catalytic reduction catalyst permeating the walls, an ammonia oxidation catalyst and an oxidation catalyst to oxidize CO and hydrocarbons is described. Methods of treating exhaust gas streams comprising soot, an ammonia precursor such as urea, ammonia, NOx, CO and hydrocarbons are also provided.

US2014/0140899 discloses a catalysed particulate filter catalysed at its inlet side with a catalyst having activity in the removal of residual hydro-carbons and carbon monoxide and catalysing at rich burn engine operation conditions the reaction of nitrogen oxides with hydrogen and/or carbon monoxide to ammonia and catalysed at its outlet side with a catalyst having activity in the selective reduction of NOx by reaction with ammonia being formed in the inlet side.

Accordingly, it is desirable to provide an improved catalysed wall-flow monolith that provides an improvement in regeneration of the filter.

SUMMARY OF THE INVENTION

In a first aspect of the invention, a catalytic wall-flow monolith filter for use in an emission treatment system comprises a first face, a second face, a filter length defined by the distance from the first face to the second face, a longitudinal direction between the first face and the second face, and first and second pluralities of channels extending in the longitudinal direction, wherein the first plurality of channels is open at the first face and closed at the second face, and the second plurality of channels is open at the second face and closed at the first face, wherein the monolith comprises a porous substrate having surfaces that define the channels and having a first zone extending in the longitudinal direction from the first face towards the second face for a distance less than the filter length and a second zone extending in the longitudinal direction from the second face towards the first face and extending in the longitudinal direction for a distance less than the filter length, wherein a first catalytic material is distributed throughout the first zone of the porous substrate, and a second catalytic material covers the surfaces in the second zone of the porous substrate and is not distributed throughout the porous substrate.

A second aspect of the invention relates to an emission treatment system for treating a flow of a combustion exhaust gas where the system comprising the catalytic wall-flow monolith filter according to the first aspect of the invention, wherein the first face is downstream of the second face, or wherein the second face is downstream of the first face.

A third aspect of the invention relates to method for the manufacture of a catalytic wall-flow monolith filter, comprising:

providing a porous substrate having a first face and a second face defining a longitudinal direction therebetween and first and second pluralities of channels extending in the longitudinal direction, wherein the first plurality of channels is open at the first face and closed at the second face, and wherein the second plurality of channels is open at the second face and closed at the first face;

selectively infiltrating the porous substrate with a washcoat containing a first catalytic material to form a first zone which includes the first catalytic material and a second zone which is free from the first catalytic material, wherein the first zone extends in the longitudinal direction from the first face towards the second face and the second zone extends in the longitudinal direction from the second face and extends to the first zone; and forming a coating of a second catalytic material, in the second zone, covering the surface of the second plurality of channels.

BRIEF DESCRIPTION OF THE DRAWINGS

The invention will now be described in relation to the following non-limiting figures, in which.

DETAILED DESCRIPTION OF THE INVENTION

Figure 1:
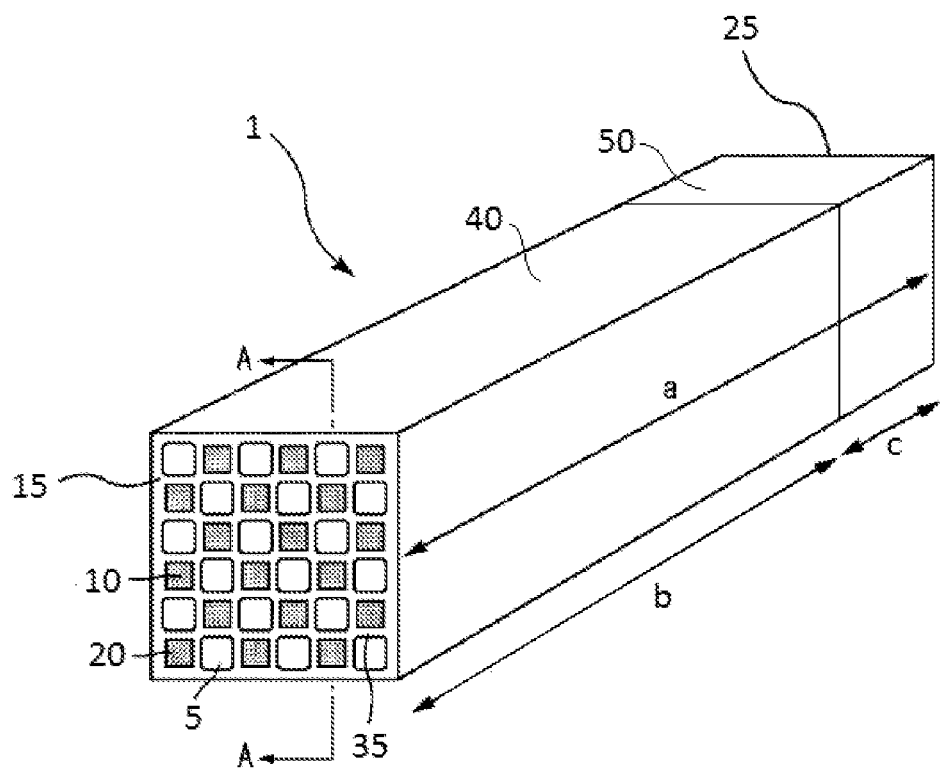
FIG. 1 is a perspective view that schematically shows a wall flow monolith filter 1 in a first orientation according to the present invention.

The present invention will now be further described. In the following passages different aspects of the invention are defined in more detail. Each aspect so defined can be combined with any other aspect or aspects unless clearly indicated to the contrary. In particular, any feature indicated as being preferred or advantageous can be combined with any other feature or features indicated as being preferred or advantageous.

The present invention relates to a catalytic wall-flow monolith filter for use in an emission treatment system. Wall-flow monoliths are well-known in the art for use in diesel particulate filters. They work by forcing a flow of exhaust gases (including particulate matter) to pass through walls formed of a porous material.

The wall-flow monolith has a first face and a second face defining a longitudinal direction therebetween. In use, one of the first face and the second face will be the inlet face for exhaust gases and the other will be the outlet face for the treated exhaust gases. As explained below, the inventors have found certain advantages associated with each of the orientations of the first and second faces relative to the flow direction.

A wall-flow monolithic filter comprises many parallel channels separated by thin walls that run axially through the monolith and are coated with one or more catalysts. The term "walls" means the physical structure of the substrate that forms the channels. The term "channel" means a space formed by walls in the substrate. The cross section of the channels can be round, oval or polygonal (triangular, square, rectangular, hexagonal or trapezoidal). The structure is reminiscent of a honeycomb.

A wall-flow monolith has first and second pluralities of channels extending in the longitudinal direction. The first plurality of channels is open at the first face and closed at the second face. The second plurality of channels is open at the second face and closed at the first face. The channels are preferably parallel to each other and provide a relatively constant wall thickness between the channels. As a result, gases entering one of the plurality of channels cannot leave the monolith without diffusing through the channel walls into the other plurality of channels. The channels are closed with the introduction of a sealant material into the open end of a channel. Preferably the number of channels in the first plurality is equal to the number of channels in the second plurality, and each plurality is evenly distributed throughout the monolith.

The wall-flow monolith comprises a number of cells. The term "cell" means a channel surrounded by one or more walls. The number of cells per unit cross-sectional area is the cell density". Preferably the mean cross-sectional width of the first and second pluralities of channels, in combination with the porous walls, results in a cell density of 100 to 600, preferably 200 to 400, cells per square inch (cpsi) (15.5 to 93 cells per square cm (cpscm), preferably 31 to 64 cpscm) The channels can be of a constant width and each plurality of channels can have a uniform channel width. Preferably, however, the plurality of channels that serves as the inlet in use has a greater mean cross-sectional width than the plurality of channels that serves as the outlet. Preferably, the difference is at least 10%. This affords an increased ash storage capacity in the filter, meaning that a lower regeneration frequency can be used. Asymmetric filters are described in WO 2005/030365, which is incorporated herein by reference.

Preferably the mean minimum thickness of the substrate between adjacent channels (i.e., wall thickness) is from 8 to 20 mil, inclusive (where a "mil" is $\frac{1}{1000}$ inch) (0.02 to 0.05 cm). Since the channels are preferably parallel and preferably have a constant width, the minimum wall thickness between adjacent channels is preferably constant. As will be appreciated, it is necessary to measure the mean minimum distance to ensure a reproducible measurement. For example, if the channels have a circular cross-section and are closely packed, then there is at least one point where the wall is thinnest between two adjacent channels. The wall thickness is preferably associated with the wall porosity and/or mean pore size. For example, the wall thickness can be between 10 and 50 times the mean pore size.

In order to facilitate the passage of gases to be treated through the channel walls, the monolith is formed out of a porous substrate. The substrate can also act as a support for holding catalytic material. Suitable materials for forming the porous substrate include ceramic-like materials such as cordierite, α-alumina, silicon carbide, silicon nitride, zirconia, mullite, spodumene, alumina-silica-magnesia or zirconium silicate, or porous, refractory metal. Wall-flow substrates can also be formed of ceramic fiber composite materials. Preferred wall-flow substrates are formed from cordierite and silicon carbide. Such materials are able to withstand the environment, particularly the high temperatures, encountered in treating the exhaust streams and can be made sufficiently porous. Such materials and their use in the manufacture of porous monolith substrates is well known in the art.

Preferably the monolith filter is porous and can have a porosity of 40 to 75%. Suitable techniques for determining porosity are known in the art and include mercury porosimetry and x-ray tomography. Preferably the coated porous substrate has a porosity of about 25 to 50% and the catalyst surface coating has a porosity of 25 to 75%. The porosity of the catalyst coating can be higher than the porosity of the coated porous substrate or the coated porous substrate can have a higher porosity relative to the porosity of the catalyst coating.

The wall-flow monolith filter comprises one or more catalysts. The term "catalyst" means a material that is responsible for increasing the rate of a reaction used in the conversion of one or more of ammonia ($NH_3$), NOx, $N_2O$, carbon monoxide (CO) and hydrocarbons (HC). A catalyst is generally applied to a wall-flow monolith filter as a catalytic material. The term "catalytic material" means a combination of a catalyst with one or more non-catalytic materials, such as supports, binders, rheology modifiers, promoters, stabilizers, etc.

The wall-flow monolith filter of the present invention has been treated with one or more catalytic materials so as to have a first zone extending in the longitudinal direction from the first face and a second zone extending in the longitudinal direction from the second face and extending to the first zone. In other words, one end of the monolith (relative to the flow of exhaust gases) forms the first zone and the remainder of the monolith at the other end forms the second zone. The first and second zones can preferably meet at a border that is preferably in a plane approximately parallel to the first and second faces. This facilitates the wash-coating process. However, it is also possible to have a border which varies across the cross-section of the monolith, such as a cone-shaped border. This can advantageously be used to increase the volume of the second zone within the monolith, since a central area of the monolith can experience elevated temperatures.

In some configurations, then wall-flow monolith filter can further comprise a gap between at least a portion of the first zone and the second zone. Preferably there is no gap between at least a portion of the first zone and the second zone.

A catalytic wall-flow monolith filter described herein can have a portion of the second catalytic material overlapping a portion of the first zone of the filter up to 10%, preferably up to 5%, of the length of the monolith substrate.

A catalytic wall-flow monolith filter described herein can have a portion of the second catalytic material overlapping a portion of the first zone of the filter and the second catalytic material can be present at up to 100%, up to 90%. up to 85%, up to 80%, up to 75%, up to 70%, up to 65%, up to 60%. up to 55%, up to 50%, up to 45%, up to 40%, up to 35%, up to 30%. up to 25%, up to 20%, up to 25%, up to 20%, up to 15%, up to 10% or up to 5% of the length of the monolith substrate.

In order to provide a catalytic wall-flow monolith of the present invention, catalytic material must be applied to the porous substrate, typically in the form of a washcoat. The application can be characterised as "on wall" application or "in wall" application. "On wall" means the catalyst material is present as a catalyst coating on the walls of the channels. The term "catalyst coating" means a catalytic material that is present on the walls of a monolith filter in a thickness of about 0.1 to 15% of the thickness of the wall upon which the coating is disposed. "In-wall" means that the catalytic material is present in the pores within the porous material. Some of the catalytic material in an on-wall application can be present in-wall.

The techniques for "in wall" or "on wall" application can depend on the viscosity of the material applied, the application technique (spraying or dipping, for example) and the presence of different solvents. Such application techniques are known in the art. The viscosity of the washcoat is influenced, for example, by its solids content. It is also influenced by the particle size distribution of the washcoat—a relatively flat distribution will give a different viscosity to a finely milled washcoat with a sharp peak in its particle size distribution—and rheology modifiers such as guar gums and other gums. Suitable coating methods are described in WO2011/080525, WO1999/047260 and WO2014/195685, which are incorporated herein by reference.

It is possible using conventional techniques to provide different zones within the substrate having different distributions of catalytic material. For example, where "on wall" application to a specific zone of the substrate is desired, a protective polymeric coating (such as polyvinyl acetate) can be applied to the remaining zone so that the catalyst coating does not form there. Once the residual washcoat has been removed, for example under vacuum, the protective polymeric coating can be burnt off.

The first zone includes catalytic material distributed throughout the porous substrate. Examples of catalytic material are discussed below. This material is included in the pores of the substrate, such as by infiltration with a wash-coating method. This coats the pores and holds catalytic material therein, while maintaining sufficient porosity for the gases to penetrate through the channel walls. The catalytic material is provided throughout the porous substrate within the first zone.

The first zone preferably includes catalytic material substantially throughout the porous substrate such that the majority of the pores contain the catalytic material. "Distributed throughout the porous substrate" means that the material is found within the porous substrate, that is, between the walls of the substrate.

This can be visually observed, for example using microscopy. The second zone does not include catalytic material substantially throughout the porous substrate. This can also be observed, for example using microscopy, by the absence of washcoat in the walls of the substrate. In the second zone, the majority of the pores are empty of the catalytic material. That is, in the first zone the catalyst is substantially within the walls and not on the surface and in the second zone the catalyst in substantially on the walls and not in the walls. The term "substantially within the walls and not on the surface" means that the majority of the material is located within the walls and that less than a majority of the material is located on the surface of porous substrate. The term "substantially on the walls and not in the walls" means that majority, preferably at least 75%, 80%, 85%, 90%, or 95%, of the material is present on the walls of the monolith in the second zone. This can be determined, for example by scanning electron microscopy (SEM). When the catalyst comprises a metal, such as copper, (electron probe microanalysis) EPMA can be used to determine the distribution of the metal in and on the walls.

In the first zone, preferably the catalytic material does not cover the walls of the first or second pluralities of channels. The term "does not cover a surface" means that there is no catalytic material present on the walls, there is no catalytic material detected on the walls of the channel, or any catalytic material detected on the walls of the channel is present at a concentration that does not have an impact on the overall catalytic activity of the monolith filter.

In the second zone, catalytic material present as a coating covers the walls of the second plurality of channels. The catalyst coating can have an average thickness of about 0.1 to 15% of the thickness of the wall upon which the coating is disposed. This thickness does not include any depth associated with penetration into the pores. A coating can also contain about 5-40% of the catalytic material based on the total weight of the catalytic material loaded on the filter as a whole.

The coating can be on the inlet or outlet side of the porous wall. The coating can cover 10-90% of the filter length, measured from the second face. For example, the coating can cover 10-25%, 25-50%, 50-75%, 35-75%, or 75-90% of the filter length. Preferably, the coating covers 10-25%, 25-50%, more preferably 10-25%, of the filter length. The coating can also comprise a catalyst concentration gradient with the high concentration of catalyst being toward the inlet end of the filter.

The catalytic wall-flow monolith filter can have a ratio of a length of the second zone to a length of the first zone in the longitudinal direction from 1:20 to 1:3, preferably 1:10 to 1:4, more preferably 1:7 to 1:4.

The size of the particles of the catalyst material can be chosen to limit their movement into the substrate. On skilled in the art would recognize that this size is dependent upon the pores sizes of the monolith filter before treatment.

The coating can comprise one or more of an SCR catalyst, a NOx trap, a soot oxidation catalyst, a hydrolysis catalyst, an adsorbent for metals such as V, Pt, Pd, Rh, Ru, Na, Cu, Fe, Co, Nu, and Cr, or an adsorbent for other poisons such as ash and/or sulphur oxides. Examples of catalytic and/or adsorbent materials include metal loaded zeolites, such as Cu/CHA, Cu/AEI, Fe/CHA, Pd/CHA, H-form zeolites, supported platinum group metals, etc.

The coating can be applied as a catalyst washcoat that contains the catalyst and optionally one or more other constituents such as binders (e.g., metal oxide particles), fibers (e.g., glass or ceramic non-woven fibers), masking agents, rheology modifiers, and pore formers.

The catalyst material can be deposited as a layer on the walls of the channels. This can be performed by a spraying or dipping approach. The catalytic material can be substantially prevented from infiltrating the porous substrate by one of several techniques, such as using a thick and viscous coating solution as described above.

In the second zone, the catalytic material covers the channel walls of the second plurality of channels from the second face as a coating on the wall having a thickness of 10 μm to 80 μm, preferably from 15 to 60 μm, more preferably 15 to 50 μm, inclusive.

The catalytic material in the second zone can extend into pores close to the surface of the substrate in the second zone and be present in a portion of the substrate near the coating. This may be necessary for the coating to adhere to the substrate. However, the catalytic material provided in the second zone is not distributed throughout the porous substrate. The term "not distributed throughout the porous substrate" means that the material is either only present on the walls of the substrate or the material is present with the majority of the material on the walls of the porous substrate and the remainder of the material in located within a portion, but not all of, the porous substrate associated with the second zone.

Preferably the catalytic material coating the channels of the second zone penetrates to one or more of <25%, <20%, <15%, <10%, and <5% of the thickness of the channel wall.

Preferably, in the second zone, the first plurality of channels is free from catalytic material on the surface thereof. The term "free from catalytic material on the surface" means there is no visual appearance of catalytic material, there is no catalytic material detected on the walls of the channel, or any catalytic material detected on the walls of the channel is present at a concentration that does not have an impact on the overall catalytic activity of the monolith filter.

The use of the foregoing first and second zones can reduce the amount of catalyst required and therefore reduce costs associated with the manufacture of the product, without compromising catalytic performance. Since the second zone of substrate does not have a significant amount (less than 0.75 g/in$^3$, preferably less than 0.5 g/in$^3$, more preferably less than 0.25 g/in$^3$) of catalytic material in the pores, back-pressures can be reduced, thus improving engine performance and reliability as well as fuel economy. This reduction in backpressure assumes the backpressure from the on-wall coating is less than the backpressure from the in-wall catalytic material. The on-wall coating provides improved access of the exhaust stream to catalyst. Where the wall-flow monolith includes an SCR catalyst, an ammonia slip catalyst or an oxidation catalyst, this allows improved NO$_x$, NH$_3$ or hydrocarbon (HC)/carbon monoxide (CO) conversion, respectively.

The second zone can have a higher permeability to exhaust gases and/or soot than the first zone. Alternatively, the second zone can have a lower permeability to exhaust gases and/or soot than the first zone.

The present inventors have found that by controlling the relative permeabilities of the first and second zones, it is possible to direct the soot location. For example, if the zone that is at the inlet when connected to the exhaust system has a lower porosity that the zone at the outlet, there will be increased gas contact with the catalyst in the outlet end. If an SCR catalyst is present in this zone, the efficiency of NO$_x$ conversion can be improved. However, if the zone that is at the outlet when connected to the exhaust system has a lower porosity than the zone at the inlet, the amount of soot going to the rear of the filter is reduced so that more burns in the front. This can reduce the temperatures reached in the rear of the filter during regeneration, improving the durability of the filter with respect to filter damage.

Catalysts for use in the wall-flow monolith include zeolites, such as ZSM-5, mordenite, gamma zeolite and beta zeolite or mixtures of any two or more thereof. The zeolite can comprise one or more metals, preferably Ce, Cu, Fe, Mn, Pt or V or any two or more thereof. The metal can be applied using known techniques such as impregnation or ion-exchange. Preferably the monolith is a selective catalytic reductant filter (SCR). Suitable catalysts for NO$_x$ reduction are known in the art, and are described, for example, in WO2009/001131, WO2010/043891 and WO2008/106519 which are incorporated herein by reference. Advantageously, an SCR monolith is able to both reduce NO$_x$ in exhaust streams and remove particulate matter in a single unit.

The catalytic material distributed throughout the first zone of the porous substrate can be the same as the catalytic material covering the surface of the second plurality of channels.

Alternatively, the catalytic material distributed throughout the first zone of the porous substrate can be different to the catalytic material covering the surface of the second plurality of channels.

Preferably the catalytic material distributed throughout the first zone of porous substrate comprises a small-pore zeolite. Small pore zeolites with particular application for treating NO$_x$ in exhaust gases of lean-burn combustion engines include zeolites selected from the AEI, AFT, AFX, CHA, DDR, EAB, ERI, GIS, GOO, KFI, LEV, LTA, MER, PAU, SFW, VNI and YUG structural families. Suitable examples are described in WO2008/132452, which is incorporated herein by reference. Small pore zeolites from the AEI and CHA families are especially preferred. The small pore zeolite preferably comprises one or more of Cu, Fe and Mn. The small pore zeolite can comprise one or more precious metals (gold, silver and platinum-group-metals), preferably with platinum-group-metals, more preferably palladium or platinum, and most preferably palladium. The catalytic material can further comprise Ce.

Catalysts present on-wall at the inlet (front) end of the wall flow monolith can preferably comprise a catalyst with a fast transient response, such as a catalyst that does not contain vanadium and does not contain a zeolite, or a a zeolite or a metal containing zeolite, such as Cu/beta.

Preferably, the more durable catalyst, such as a copper-containing small pore zeolite, is located on the downstream portion of the wall flow monolith.

Preferably, when two SCR catalysts are used, the on-wall catalyst located on the downstream (rear) section of the wall flow monolith has the higher thermal stability. Vanadium containing catalysts have high thermal stability.

Preferably the catalytic material distributed throughout the first zone of the porous substrate and the catalytic material covering the surface of the second plurality of channels are independently selected from copper, iron or manganese containing zeolites, such as AEI, AFX, BEA, CHA and LTA.

One of the difficulties in treating $NO_x$ in an exhaust gas is that the quantity of $NO_x$ present in the exhaust gas is transient, i.e. it varies with driving conditions, such as acceleration, deceleration and cruising at various speeds. In order to overcome this problem, SCR catalysts can adsorb (or store) nitrogenous reductant such as ammonia, thus providing a buffer to the appropriate supply of available reductant. Molecular sieve-based catalysts such as those described above can store ammonia, and the catalyst activity at the onset of exposure of the catalyst to $NH_3$ can be substantially lower than the activity when the catalyst has a relatively high exposure or saturated exposure to $NH_3$. For practical vehicle applications, this means the catalyst needs to be pre-loaded with an appropriate $NH_3$ loading to ensure good activity. However, this requirement presents some significant problems. In particular, for some operating conditions, it is not possible to achieve the required $NH_3$ loading; and this pre-loading method has limitations because it is not possible to know what the engine operating conditions will be subsequent to pre-loading. For example, if the catalyst is pre-loaded with $NH_3$ but the subsequent engine load is at idle, $NH_3$ can be slipped to atmosphere. The rate of increase of activity of the SCR catalyst from zero ammonia exposure to saturated ammonia exposure is referred to as the "transient response". In this regard, it is preferable that the catalytic material covering the surface of the second plurality of channels is a large-pore zeolite, preferably a copper beta zeolite. Alternatively, other, non-zeolite, catalytic materials can be used such as $CeO_2$ impregnated with W, $CeZrO_2$ impregnated with W, or $ZrO_2$ impregnated with Fe and W. Other suitable catalysts are described in WO2009/001131 and WO2011/064666, which are incorporated herein by reference. Using such large-pore zeolites or non-zeolite materials as a coating is advantageous because these materials generally provide a faster transient SCR response than the small-pore zeolites described above, since they require significantly less pre-loaded ammonia to function effectively. In other words, they have high activity at lower $NH_3$ exposures (low exposure relative to the saturated storage capacity of the catalyst) compared to the small pore zeolites). There can be a synergistic relationship between the small pore zeolites described above and the large-pore zeolites and non-zeolite materials described presently.

In another aspect, there is provided an emission treatment system for treating a flow of a combustion exhaust gas, the system comprising the catalytic wall-flow monolith as described herein, wherein the catalytic filter is present in the system in one of two configurations.

In the first configuration, the first face is downstream of the second face. This results in the second zone comprising the on-wall catalyst, being upstream of the first zone containing the in-wall catalyst. The loading of the catalyst material in the second zone, which is adjacent to the entrance to the filter, can be lower than that used in configurations that do not this this configuration. This reduced loading means that the portion of the monolith containing the second zone at the entrance monolith can heat up more quickly. This can be advantageous because the catalyst present on the surface can reach an operation temperature faster.

In the second configuration, the second face is downstream of the first face. This results in the first zone comprising the in-wall catalyst being upstream of the second zone comprising the on-wall catalyst. In this configuration, there is less catalytic material in the second zone of the filter, which becomes hottest in use. This means that on active regeneration there is less likely to be degeneration of the catalyst in the first zone. When the channels in the substrate that are the outlet channels are narrower that the inlet channels, the back pressure does not decrease the filter to the same extent as when the inlet and outlet channels have the same size.

The catalytic wall flow monolith filters described herein are beneficial for a number of reasons.

The system can provide one or more of: reduced soot accumulation, reduced back-pressure, lower light-off temperature, increased $NH_3$, HC or CO conversion, compared to a wall flow filter having the same components in a different configuration.

In particular, the presence of the on-wall coating at the inlet end of the filter enhances particulate filtration by enabling the soot to move toward the back of the inlet end. This can result in an increase the relationship between backpressure to soot loading, such as when a graph is made of backpressure versus loading and the slope (gradient) of the response increases. An advantage of this occurrence is that vehicle sensors monitor the back pressure across a filter and trigger strategies to regenerate (or combust) excess soot on the filter when such back pressure exceeds a threshold value. By having a steeper soot loaded back pressure gradient, the monitoring system recognises more easily that backpressure threshold value has been reached and so the triggering of regeneration events is more efficient and predictable.

In addition, as described in WO2011/064666, the "transient response" of the preferred thermally durable small pore zeolites-based SCR catalysts is relatively poor compared with other zeolite catalysts such as Beta zeolite. This manifests itself by requiring a higher "fill" level of the catalyst with ammonia before it becomes more reactive. In a dynamic environment such as a vehicle engine exhaust gas, where many variables such as gas components, gas flow rate and temperature are changing rapidly, this can be a problem. Where the in-wall catalyst downstream is the preferred small pore zeolite-based SCR catalyst, the SCR catalyst on-wall on the inlet side is preferably a SCR catalyst having faster transient response.

It is also possible to coat on-wall at the inlet end a soot combustion catalyst, such as a copper-based catalyst supported on a ceria-zirconia mixed oxide. There is a combustion reaction of soot in $NO_2$ ($NO_2 \rightarrow NO+CO$) which is preferred in heavy-duty diesel (HDD) applications (because HDD exhaust gas is generally hotter than a passenger vehicle and this thermodynamically favours NO oxidation to $NO_2$ on a suitable catalyst). Soot can be combusted in $NO_2$ at relatively lower temperatures than in air. Of course, if an on-wall SCR catalyst consumes oxides of nitrogen upstream of the filtered soot, there is less available to turn into $NO_2$ to promote the soot combustion. $Cu/CeO_2$—$ZrO_2$ is an NO oxidation catalyst and is less likely to consume (oxidise) $NH_3$. Accordingly, the preferable provision of a copper-based catalyst on a coated second zone allows the process to generate $NO_2$ and not oxidise $NH_3$; thus both species are available to do their work downstream ($NO_2$ to oxidise soot; $NH_3$ to reduce NOx).

Where the on-wall coating is provided on the exit-side of the wall flow filter, the first zone is upstream of the second zone, oxides of nitrogen still present in exhaust gas exiting the filter via the downstream wall flow filter channels can contact an on-wall SCR catalyst coating, if it is present in the on-wall coating. This can provide better contact/accessibility between the reactants and the active catalytic component sites than the configuration where the on-wall coatings in the second zone are upstream of the in-wall catalytic material in the first zone and material exiting the on-wall coating has reduced contact with the in-wall catalytic material and will, in large part bypass the catalytic material in the first zone. This configuration can provide NOx conversion in relatively high flow rate applications; or allow for shorter/less volume substrates that are cheaper to manufacture, potentially lighter (less weight benefit fuel economy and so reduces $CO_2$ emissions), less problematic to packaging (canning) and easier to find space for on the vehicle. Were the catalyst to be in-wall, such gas/catalyst contact would be reduced because of laminar flow of the gas exiting the filter channels and less possibility for the gas to penetrate the boundary layer at the surface of the wall-flow filter.

The on-wall coating on the outlet end of the filter changes the flow dynamics within the upstream channels whereby soot is less likely to collect towards the rear of the inlet channels. Gas flow and soot carried by the gas will follow the path of least resistance. More of the gas will pass through the walls near the inlet end, then travel down the filter channels by laminar flow as described above.

If the outlet ends of the filter are coated on-wall with a catalytic washcoat that increases flow resistance across the walls of the filter in that area, soot filtration can be spread along the inlet channel walls more effectively. This provides the advantage that when a filter regeneration event is triggered, there is less localised heat generation and so thermal gradients and stresses in the substrate are reduced and so there is a reduced possibility of filter cracking and failure of the substrate.

By spreading the effective filtration area to include the area upstream in the inlet channels, filtration as a whole can be improved. Filter service life can also be improved because ash accumulation is spread throughout the monolith filter more effectively and not just collected towards the rear of the inlet channels. Ash accumulates in diesel particulate filters from a number of sources. For example, lubricant oil additives contribute to the majority of ash found in diesel particulate filters (DPFs). Other sources for producing ash include fuel-borne additives that enhance filter regeneration (as opposed to catalysing the filter per se), trace metals in diesel fuels, wear particles in engine and exhaust systems and corrosion products.

According to a further aspect there is provided a method for the manufacture of a catalytic wall-flow monolith, comprising:

providing a porous substrate having a first face and a second face defining a longitudinal direction therebetween and first and second pluralities of channels extending in the longitudinal direction, wherein the first plurality of channels is open at the first face and closed at the second face, and wherein the second plurality of channels is open at the second face and closed at the first face;

selectively infiltrating the porous substrate with a washcoat containing a first catalytic material to form a first zone which includes the first catalytic material and a second zone which is free from the first catalytic material, wherein the first zone extends in the longitudinal direction from the first face and the second zone extends in the longitudinal direction from the second face and extends to the first zone; and forming a coating of a second catalytic material, in the second zone, covering the walls of the second plurality of channels.

Selective infiltration of the substrate by the washcoat can be performded by immersing the substrate vertically in a catalyst slurry such that the desired boundary between the first and second substrate zones is at the surface of the slurry. The substrate can be is left in the slurry for a sufficient period of time to allow the desired amount of the slurry to move into the substrate. The period of time should be less than 1 one minute, preferably about 30 seconds. The substrate is removed from the slurry, and excess slurry is removed from the wall-flow substrate first by allowing it to drain from the channels of the substrate, then by blowing on the slurry on the substrate with compressed air (against the direction of slurry penetration), and then pulling a vacuum from the direction of slurry penetration. By using this technique, the catalyst slurry permeates the walls of the first zone of the substrate, yet the pores are not occluded to the extent that back pressure will build up in the finished substrate to unacceptable levels. One skilled in the art would recognize the unacceptable levels for the back pressure depend upon a variety of factors including the size of the engine to which the filter is connected, the conditions under which the engine is run and the frequency and method of regenerating the filter.

The coated substrates are dried typically at about 100° C. and calcined at a higher temperature (e.g. 300 to 450° C.). After calcining, the washcoat loading can be determined from the coated and uncoated weights of the substrate. The catalyst loading can be determined from the washcoat loading based on the amount of catalyst in the washcoat. As will be apparent to those of skill in the art, the washcoat loading can be modified by altering the solids content of the coating slurry. Alternatively, repeated immersions of the substrate in the coating slurry can be conducted, followed by removal of the excess slurry as described above.

The coating of the second catalytic material can be formed as described above and in WO2011/080525, WO1999/047260 and WO2014/195685. To prevent coating of the second catalytic material from forming in the first zone of the substrate, the surface in the first zone can be pre-coated with a protective polymeric film, such as polyvinyl acetate. This prevents the catalytic material from adhering to the surface of the substrate in the first zone. The protective polymeric coating can then be burnt off.

Preferably the catalytic wall-flow monolith manufactured according to the foregoing method is the monolith as described herein. That is, all features of the first aspect of the invention can be freely combined with the further aspects described herein.

According to a further aspect of the invention, provided is a method for treating a flow of a combustion exhaust gas comprising $NO_x$ and particulate matter, the method comprising passing the exhaust stream through the monolith of the first aspect of the invention, wherein the first face is downstream of the second face, or wherein the second face is downstream of the first face.

The method can provide for one or more of: reduced particulate matter downstream of the wall flow monolith and increased NOx conversion, compared to a wall flow filter having the same components in a different configuration The advantages associated with the orientation of the monolith within the emission treatment system are discussed herein.

The exhaust systems of the present invention are for use in internal combustion engines and in particular to lean-burn internal combustion engines, especially diesel engines.

FIGS. 1 to 4 and 8 show various features of aspects of the invention. Below is an index with the name of the feature and the corresponding identifier in these figures.

| wall flow monolith | 1 |
|---|---|
| first subset of channels | 5 |
| second subset of channels | 10 |
| first end face | 15 |
| sealing material | 20 |
| second end face | 25 |
| channels wall | 35 |
| first zone | 40 |
| catalytic material | 45b |
| catalytic material | 45c |
| second zone | 50 |
| monolith length | a |
| length of first zone | b |
| length of second zone | c |
| cross sectional plane | A-A |
| exhaust gas treatment system | 100 |
| ammonia reductant | 105 |
| flow of exhaust gas | 110 |
| engine | 115 |
| ducting | 120 |
| exhaust system | 125 |
| reservoir | 130 |
| controller | 135 |
| injection nozzle | 140 |

A wall flow monolith 1 according to the present invention is shown in FIG. 1-4. The monolith comprises a large number of channels arranged in parallel with each other in the longitudinal direction (shown by a double-sided arrow "a" in FIGS. 1 and 3) of the monolith 1. The large number of channels has a first subset of channels 5 and a second subset of channels 10. The monolith filter is composed of a porous material.

FIG. 1 shows the monolith filter 1 with the first edge face 15 towards the front. In this configuration, exhaust gas enters the monolith filter 1 through a first subset of channels 5 that are open at the first end face 15 and sealed at the second end face 25. The second subset of channels 10 is sealed at the first end face 15 with sealing material 20 and have open ends at the second end face 25. The filter monolith comprises a first zone 40 having a length b and a second zone 50 having a length c. FIG. 1 also shows a plain A-A passing through the monolith filter.

A first zone 40 of the wall flow monolith 1 extends a distance b from the first end face 15 and is provided with a catalytic material within pores of the channels walls 45b. This can be provided using a washcoat application method, as is known in the art and is discussed elsewhere in the specification.

A second zone 50 of the wall flow monolith lextends a distance c from the second end face 25 towards the first end face and meets the first zone 40. The second zone 50 is not provided with a catalytic material 45b within pores of the channels walls 35. A surface coating of a catalytic material 45c, such as a zeolite (not necessarily, but preferably, the same as the catalytic material 45b), is applied to the surface of the channel walls 35 within the second zone 50. The closed channel walls 35 within the second zone 50 are not surface coated.

Figure 2:
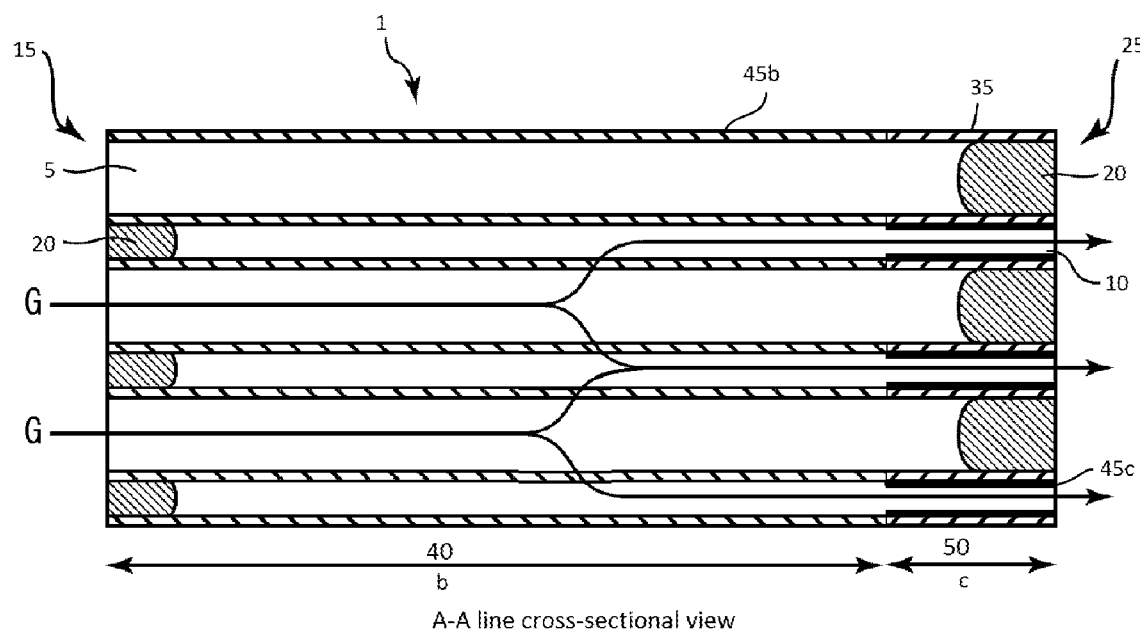
FIG. 2 is a cross-sectional view of the wall flow monolith filter 1 shown through plane A-A in FIG. 1.

FIG. 2 shows a cross-section plane A-A of the filter monolith. The first subset of channels 5 is open at the first end face 15 of the wall flow monolith 1 and is sealed with a sealing material 20 at the second end face 25. A second subset of channels 10 is open at the second end face 25 of the wall flow monolith 1 and is sealed with a sealing material 20 at the first end face 15. The first end face 15 receives exhaust gas G from an engine. The exhaust gas G enters the monolith filter 1 at the open end of the first subset of channels 5. Gas passing down the first subset of channels 5 cannot exit the channel at the second end face 25 because the end is sealed 20. Gas G passes through the porous channel walls 35 and moves into the second subset of channels 10 and then exits the monolith filter at the second end face 25 which is connected to the exhaust system of the engine. When the gas G passes through the porous channel walls 35, soot becomes trapped by or in the walls.

The monolith filter comprises a first zone 40 that contains catalytic material 45b within the walls 35 of the monolith filter and extends from the first end face 15 a distance b towards the second end face 25. The monolith filter also comprises a second zone 50 that contains catalytic material 45c on the walls 35 of the monolith filter. The second zone extends from the second end face 55 a distance c towards the first end face 25.

Figure 3:
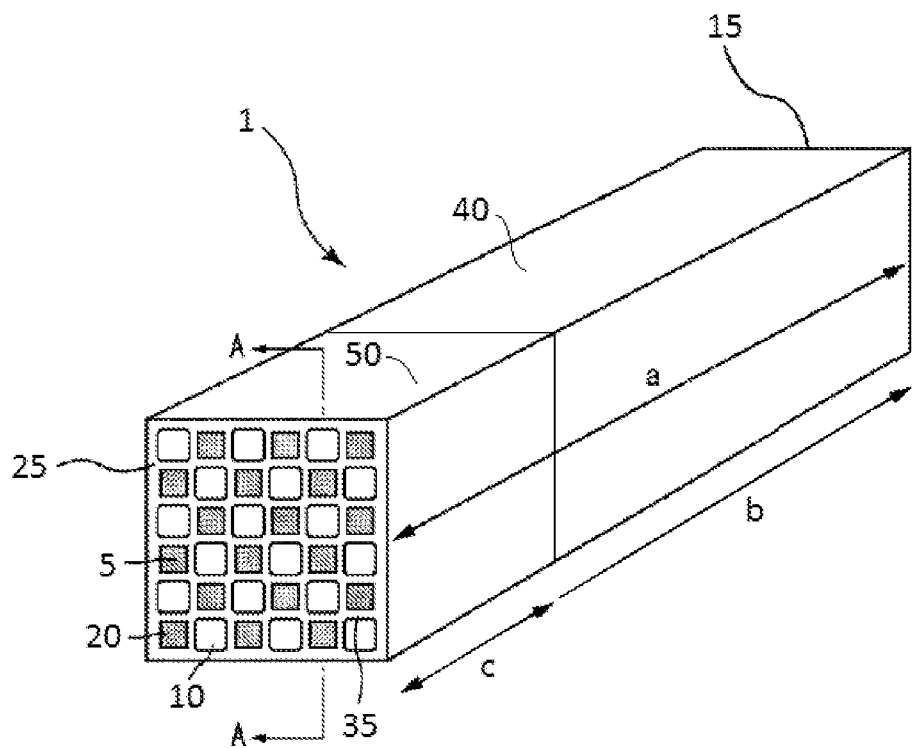
FIG. 3 is a perspective view that schematically shows a wall flow monolith filter 1 in a second orientation according to the present invention.
Figure 4:
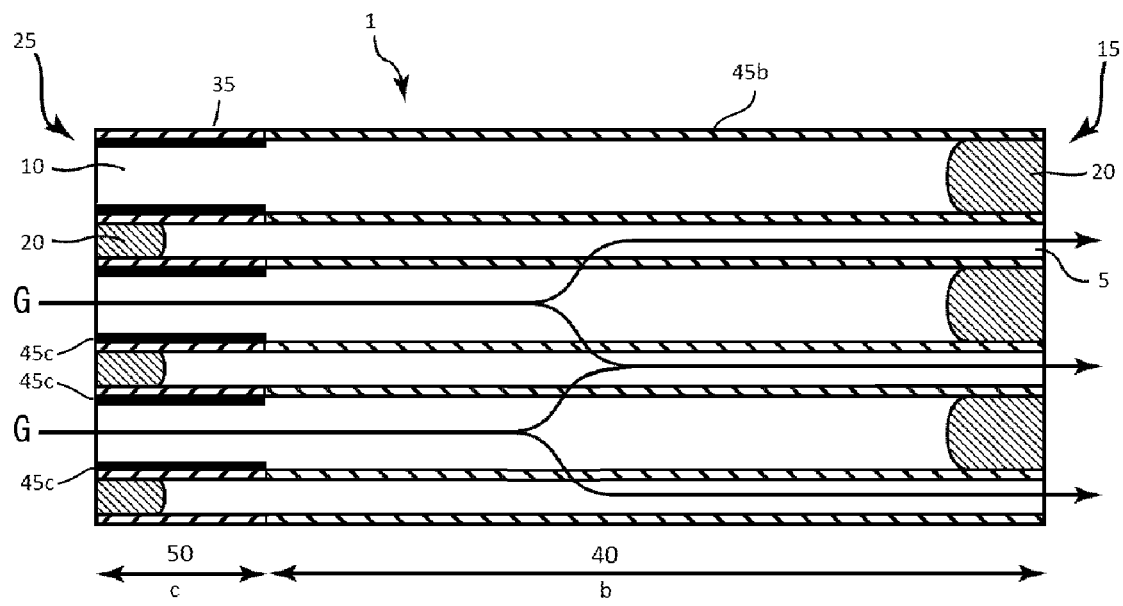
FIG. 4 is a cross-sectional view of the wall flow monolith filter 1 shown through plane A-A in FIG. 3.

FIGS. 3 and 4 are analogous to FIGS. 1 and 2 except that the monolith filter is rotated 180 degrees so that the second edge face 25 is where the first edge face 15 is in FIGS. 1 and 2.

FIG. 3 shows the monolith filter 1 with the second edge face 25 towards the front. In this configuration, exhaust gas enters the monolith filter 1 through a second subset of channels 10 that are open at the second end face 25 and sealed at the first end face 15. The first subset of channels 5 is sealed at the first end face 15 with sealing material 20 and have open ends at the second end face 25. The filter monolith comprises a first zone 40 having a length b and a second zone 50 having a length c. FIG. 1 also shows a plain A-A passing through the monolith filter.

A second zone 50 of the wall flow monolith 1 extends a distance c from the second end face 25 towards the first end face and meets the first zone 40. The second zone 50 is not provided with a catalytic material 45b within pores of the channels walls 35. A surface coating of a catalytic material 45c, such as a zeolite (not necessarily, but preferably, the same as the catalytic material 45b), is applied to the surface of the channel walls 35 within the second zone 50. The closed channel walls 35 within the second zone 50 are not surface coated.

A first zone 40 of the wall flow monolith 1 extends a distance b from the first end face 15 and is provided with a catalytic material within pores of the channels walls 45b. This can be provided using a washcoat application method, as is known in the art and is discussed elsewhere in the specification.

FIG. 4 shows a cross-section plane A-A of the filter monolith. The second subset of channels 10 is open at the second end face 25 of the wall flow monolith 1 and is sealed with a sealing material 20 at the first end face 15. A first subset of channels 5 is open at the first end face 15 of the wall flow monolith 1 and is sealed with a sealing material 20 at the first end face 15. The second end face 25 receives exhaust gas G from an engine. The exhaust gas G enters the monolith filter 1 at the open end of the second subset of channels 10. Gas passing down the second subset of channels 10 cannot exit the channel at the first end face 15 because the end is sealed 20. Gas G passes through the porous channel walls 35 and moves into the first subset of channels 5 and then exits the monolith filter at the first end face 15 which is connected to the exhaust system of the engine. When the gas G passes through the porous channel walls 35, soot becomes trapped by or in the walls.

The monolith filter comprises a first zone 40 that contains catalytic material 45b within the walls 35 of the monolith filter and extends from the first end face 15 a distance b towards the second end face 25. The monolith filter also comprises a second zone 50 that contains catalytic material 45c on the walls 35 of the monolith filter. The second zone extends from the second end face 55 a distance c towards the first end face 25.

In FIGS. 2 and 4, the channels are depicted such that the second subset of channels 10 is narrower than the first subset of channels 5. The configuration of FIG. 2 can provide an increased ash storage capacity in the filter. Alternatively, the channels can be the same size.

The catalytic material in the first and second zones can comprise one or more catalysts. Preferably at least one of the catalysts is an SCR catalyst. The SCR catalyst can comprise a molecular sieve, preferably an exchanged transition metal containing molecular sieve, in the channel wall 35 of the monolith 1. This molecular sieve, in combination with a reducing agent such as ammonia, can catalytically reduce $NO_x$ to $N_2$.

When the on-wall coating on the monolith is located at the entrance of the exhaust gas flow into the monolith, gas can access the catalyst better, assuming that gas access to the on-wall coating is easier because the gas does not need to penetrate the porous wall comprising catalytic material. Catalyst in the wall can be considered to being "diluted" by the wall. The concentration of the catalyst in the on-wall coating is generally present at a higher concentration than the catalyst in the wall. In addition, some of the pores in the walls do not contain open passages through the wall, but rather have "dead ends" for gas flow. Maximizing catalytic activity in this zone can be important because catalysts in this location: (a) will be exposed to exposed to heat first and therefore will light-off first, (b) will also light-off first because catalyst further downstream on or in the monolith will have delayed light-off because of a thermal lag from heating up the filter, and (c) this location gets the least thermal ageing because soot regeneration temperatures are much lower in the front (e.g. 700° C.) than in the rear (e.g. 1100° C. in the rear).

When the on-wall coating on the monolith is located at the rear of the monolith (outlet of the exhaust gas flow from the monolith), the on-wall coating zone can be more impermeable than the upstream in-wall zone. This configuration will affect the gas flow through the monolith and can be used to:
  a. lower the amount of soot located in the rear of the monolith to reduce peak temperatures in the rear of the monolith during an uncontrolled soot regeneration and hence prevent damage to the filter;
  b. direct the majority of the exhaust gas to go thru the upstream zone wall, and then pass over the downstream on-wall zone. This will help ensure that at least the majority, if not almost all, of the exhaust gas is exposed to the catalyst in the upstream zone. This can be important when the on-wall catalyst is a different catalyst than the downstream catalyst. For example, if the on-wall catalyst is an ammonia slip catalyst (ASC) or a diesel oxidation catalyst (DOC), these catalysts can remove all, or almost all, of the $NH_3$ or HC/CO, respectively.
  c. generate more NOx, especially when ash from soot combustion is located in the rear of the inlet channels. Having an in-wall catalyst in the rear zone would be ineffective because the catalyst would be masked because of the preferred flow through the walls of the monolith in the upstream zone. Therefore, it would be beneficial to have this catalyst on-wall in the rear outlet channel.

In some configurations, two SCR catalysts are used. In other configurations, an on-wall catalyst could be an ASC, or an oxidation catalyst at the rear, especially if there is no DOC upstream on the wall-flow monolith.

Figure 5:
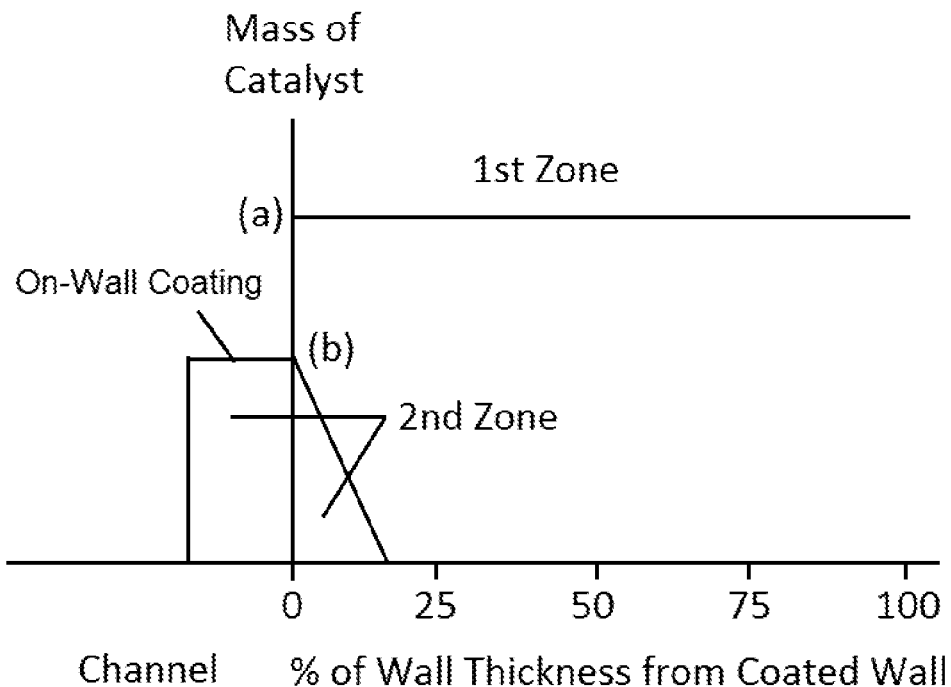
FIG. 5 is a graphical representation of an example of the amount of catalytic material (by weight) in the first and second zones of the monolith.
Figure 6:
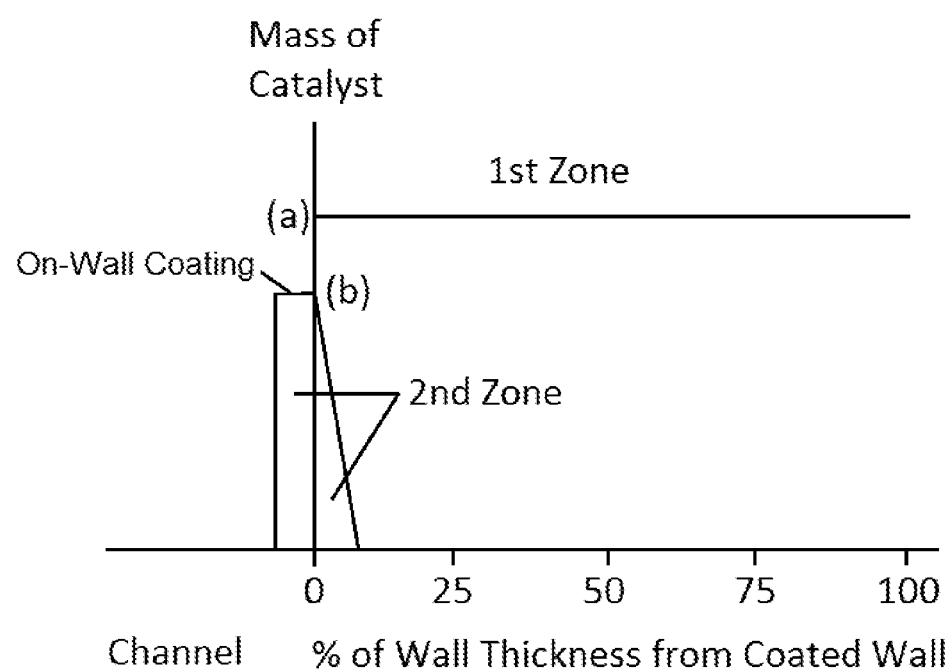
FIG. 6 is a graphical representation of another example of the amount of catalytic material (by weight) in the first and second zones of the monolith.
Figure 7:
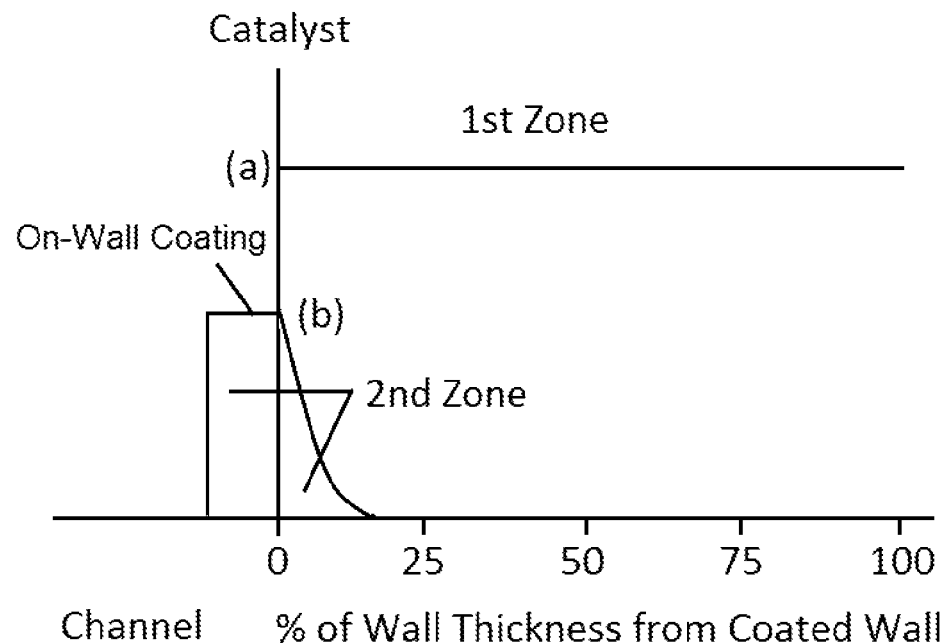
FIG. 7 is a graphical representation of a further example of the amount of catalytic material (by weight) in the first and second zones of the monolith.

Exemplary distributions of the catalyst in the first and second zones are shown in FIGS. 5-7. In each of these figures, for zone 1, the mass (a) of the catalyst is relatively constant throughout the wall, as shown by the horizontal line. In actual samples, there can be some variation based on the processes used to produce the sample. However, in the second zone, the catalyst can be present in two areas: the coating on the wall and within a portion of the wall, but not distributed throughout the wall.

FIG. 5 shows a coating having a thickness of about 15% of the wall thickness of the untreated filter with a portion of the catalyst penetrating the catalyst wall to a depth of about 15% of the thick ness of the wall. The coating has a mass (b) that is approximately uniform throughout its thickness. The mass of the catalyst in the wall decreases from the having the mass (b) of the coating at the surface of the wall to having no catalyst at a wall thickness of about 15% of the wall thickness of the untreated filter. FIG. 5 shows the decrease in mass of the catalyst within the wall being linear with depth. The decrease in mass of the catalyst within the wall with depth can be non-linear, as shown in FIG. 6.

FIG. 7 shows a coating having a thickness of about 5% of the wall thickness of the untreated filter with a portion of the catalyst penetrating the catalyst wall to a depth of about 5% of the thick ness of the wall. The coating has a mass (b) that is approximately uniform throughout its thickness. The mass of the catalysts in this coating can be greater than shown in FIG. 5 as shown by the increased height of the coating. The mass of the catalyst in the wall decreases from the having the mass (b) of the coating at the surface of the wall to having no catalyst at a wall thickness of about 5% of the wall thickness of the untreated filter. FIG. 7 shows the decrease in mass of the catalyst within the wall being non-linear with depth. The decrease in mass of the catalyst within the wall can be linear with depth, as shown in FIGS. 5 and 6.

Figure 8:
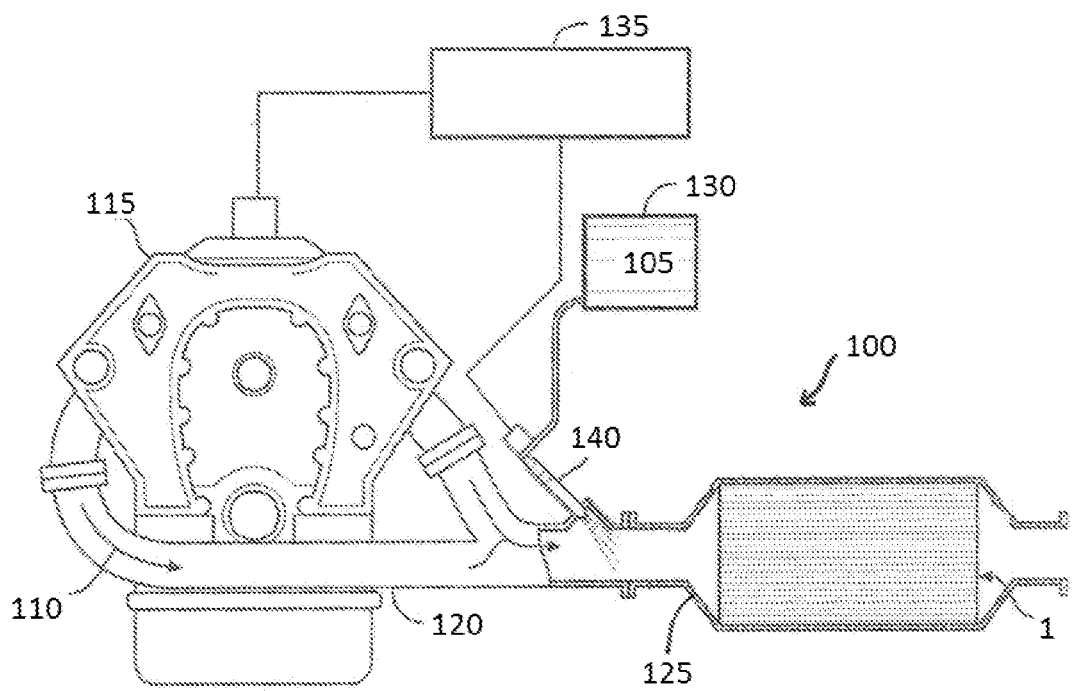
FIG. 8 is a schematic diagram of an exhaust gas treatment system for a diesel engine.

In an exemplary exhaust gas treatment system 100, shown in FIG. 8, an ammonia reductant 105 is injected into the flow of exhaust gas 110 upstream of the wall flow monolith 1. The exhaust gas 110 is passed from the engine 115 through ducting 120 to the exhaust system 125. The ammonia reductant 105 is dispensed from a reservoir 130 as required (as determined by controller 135) through an injection nozzle 140 and mixes with the exhaust gas prior to reaching the monolith 1 which acts as an SCR device.

The wall flow monolith 1 is preferably a single component. However, the monolith can be formed by adhering together a plurality of channels or by adhering together a plurality of smaller monoliths as described herein. Such techniques are well known in the art, as well as suitable casings and configurations of the emission treatment system.

All or any combination of these features in a coating can improve soot-loaded backpressure (particularly in combination with filter efficiency), reduce exotherms during filter regeneration, improve filter thermal and mechanical durability (e.g. avoid cracking, peeling, etc.), protect temperature sensitive catalyst from high temperature spike, improve catalyst performance overall and on per weight basis, lower $N_2O$ formation, allows better $NH_3$ utilization, and capture poisons such as Pt, ash, sulfur oxides, Na and Fe, and mitigate the potential loss of metals via volatilization.

It will be understood by those skilled in the art that variations to the composition and configurations of the catalytic wall-flow monolith filter and systems comprising the catalytic wall-flow monolith filter can be made thereto without departing from the scope of the invention or of the appended claims.

The invention claimed is:

1. A catalytic wall-flow monolith filter for use in an emission treatment system comprises a first face, a second face, a filter length defined by the distance from the first face to the second face, a longitudinal direction between the first face and the second face, and first and second pluralities of channels extending in the longitudinal direction, wherein the channels are a space formed by walls in the substrate, wherein the first plurality of channels is open at the first face and closed at the second face, and the second plurality of channels is open at the second face and closed at the first face, wherein the monolith filter comprises a porous substrate having surfaces that define the channels and having a first zone extending in the longitudinal direction from the first face towards the second face for a distance less than the filter length and a second zone extending in the longitudinal direction from the second face towards the first face and extending in the longitudinal direction for a distance less than the filter length, wherein a first catalytic material is distributed throughout the first zone of the porous substrate, wherein a second catalytic material covers the surfaces in the second zone of the porous substrate and is not distributed throughout the porous substrate;

wherein the first catalytic material comprises a small-pore zeolite selected from the AEI, AFT, CHA, DDR, EAB, ERI, GIS, GOO, KFI, LEV, MER, PAU, VNI and YUG structural families, and, wherein the second catalytic material comprises $CeO_2$ impregnated with W, $CeZrO_2$ impregnated with W, or $ZrO_2$ impregnated with Fe and W.

2. A catalytic wall-flow monolith filter according to claim 1, wherein in the second zone, the surfaces are free of catalytic material at the first plurality of channels.

3. A catalytic wall-flow monolith filter according to claim 1, wherein in the first zone, the catalytic material does not cover a surface of the first or second pluralities of channels.

4. A catalytic wall-flow monolith filter according to claim 1, wherein the filter has a cell density of 100 cpsi to 600 cpsi (15.5 cpscm to 93 cpscm).

5. A catalytic wall-flow monolith filter according to claim 1, wherein the mean minimum thickness of the substrate between adjacent channels is from 8 to 20 mil (0.02 to 0.05 cm).

6. A catalytic wall-flow monolith filter according to claim 1, wherein the catalytic material in the second zone covers the walls of the second plurality of channels as a coating having a thickness of between 10 µm to 80 µm, inclusive.

7. A catalytic wall-flow monolith filter according to claim 1, wherein the catalytic material distributed throughout the first zone of the porous substrate is the same as the catalytic material covering the surface of the second plurality of channels.

8. A catalytic wall-flow monolith filter according to claim 1, wherein the catalytic material distributed throughout the first zone of the porous substrate is different than the catalytic material covering the surface of the second plurality of channels.

9. A catalytic wall-flow monolith filter according to claim 1, wherein the ratio of a length of the second zone to a length of the first zone in the longitudinal direction is from 1:20 to 1:5.

10. A catalytic wall-flow monolith filter according to claim 1, wherein a portion of the second catalytic material overlaps a portion of the first zone of the filter up to 10% of the length of the monolith substrate.

11. A catalytic wall-flow monolith filter according to claim 1, wherein the second catalytic material overlaps the first zone of the filter and the second catalytic material is present at up to 90% of the length of the monolith substrate.

12. A catalytic wall-flow monolith filter according to claim 1, further comprising a gap between at least a portion of the first zone and the second zone.

13. A catalytic wall-flow monolith filter according to claim 1, wherein there is no gap between at least a portion of the first zone and the second zone.

14. The catalytic wall flow monolith of claim 1, wherein the wall flow monolith provides one or more of: reduced soot accumulation, reduced back-pressure, lower light-off temperature, increased $NH_3$, HC or CO conversion, compared to a wall flow filter having the same components in a different configuration.

15. An emission treatment system for treating a flow of a combustion exhaust gas, the system comprising the catalytic wall-flow monolith filter according to claim 1, wherein the first face is downstream of the second face, or wherein the second face is downstream of the first face.

16. An emission treatment system of claim 15, wherein the system provides one or more of: reduced soot accumulation, reduced back-pressure, lower light-off temperature, increased $NH_3$, HC or CO conversion, compared to a wall flow filter having the same components in a different configuration.

17. A method for the manufacture of a catalytic wall-flow monolith filter of claim 1, the method comprising:

providing a porous substrate having a first face and a second face defining a longitudinal direction therebetween and first and second pluralities of channels extending in the longitudinal direction, wherein the first plurality of channels is open at the first face and closed at the second face, and wherein the second plurality of channels is open at the second face and closed at the first face;

selectively infiltrating the porous substrate with a washcoat containing a first catalytic material to form a first zone which includes the first catalytic material and a second zone which is free from the first catalytic material, wherein the first zone extends in the longitudinal direction from the first face towards the second face and the second zone extends in the longitudinal direction from the second face and extends to the first zone; and forming a coating of a second catalytic material, in the second zone, covering the walls of the second plurality of channels.

18. A method for treating a flow of a combustion exhaust gas comprising $NO_x$, and particulate matter, the method comprising passing the exhaust stream through the monolith of claim 1, wherein the first face is downstream of the second face, or wherein the second face is downstream of the first face.

19. The method of claim 18, wherein the method provides for one or more of: reduced particulate matter downstream of the wall flow monolith and increased NOx conversion, compared to a wall flow filter having the same components in a different configuration.

* * * * *